Figure 5:
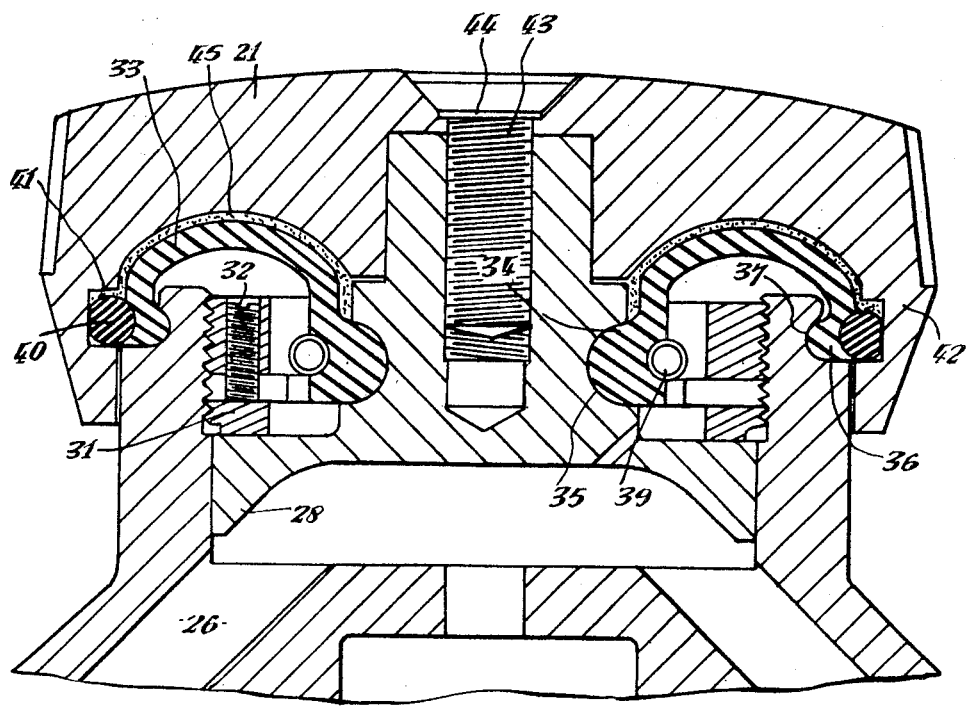

United States Patent
Nash

[15] 3,650,359
[45] Mar. 21, 1972

[54] OSCILLATING PISTON-TYPE DASHPOTS

[72] Inventor: Alan Richard Brine Nash, 39 Abbot's Ride, Farnham, England

[22] Filed: Feb. 3, 1970

[21] Appl. No.: 8,165

[30] Foreign Application Priority Data

Mar. 17, 1969 Great Britain.....................13,962/69

[52] U.S. Cl.................................188/310, 16/58, 188/322, 277/59, 277/138, 277/165
[51] Int. Cl........................................................F16d 57/02
[58] Field of Search.................188/306, 308, 309, 310, 322, 188/296; 16/58, 57; 277/59, 138, 164, 165

[56] References Cited

UNITED STATES PATENTS

| 2,670,816 | 3/1954 | Armstrong.............................188/322 |
| 1,290,115 | 1/1919 | Derihon................................188/306 |

FOREIGN PATENTS OR APPLICATIONS

| 1,026,593 | 4/1966 | Great Britain..........................188/310 |

Primary Examiner—George E. A. Halvosa
Attorney—Cameron, Kerkam & Sutton

[57] ABSTRACT

The specification describes a dashpot having a vane member pivotably mounted in a fluid-filled body to be rotatable through an angle of less than 360°. Movement of the vane member displaces the dashpot fluid through a valve that has an adjustable throttling effect and the damping rate of the dashpot is controlled thereby. The valve is mounted in a recess of a necked end of the dashpot body concentric with the pivot axis of the vane member and a control knob having a lip that overlaps said necked end is fixed to the valve to rotate it. A ring-form sealing member has an inner peripheral region secured to the valve and an outer peripheral region secured to the necked end of the body. A supplementary sealing member is compressed between said outer peripheral region and the control knob lip to provide a further seal at this position. A resilient clamping band at the inner peripheral region assists the seal there. Calibration means are also provided between the control knob lip and said necked end of the body to facilitate adjustment of the valve and these calibration means are further employed to set limits to the rotational adjustment of the valve.

8 Claims, 5 Drawing Figures

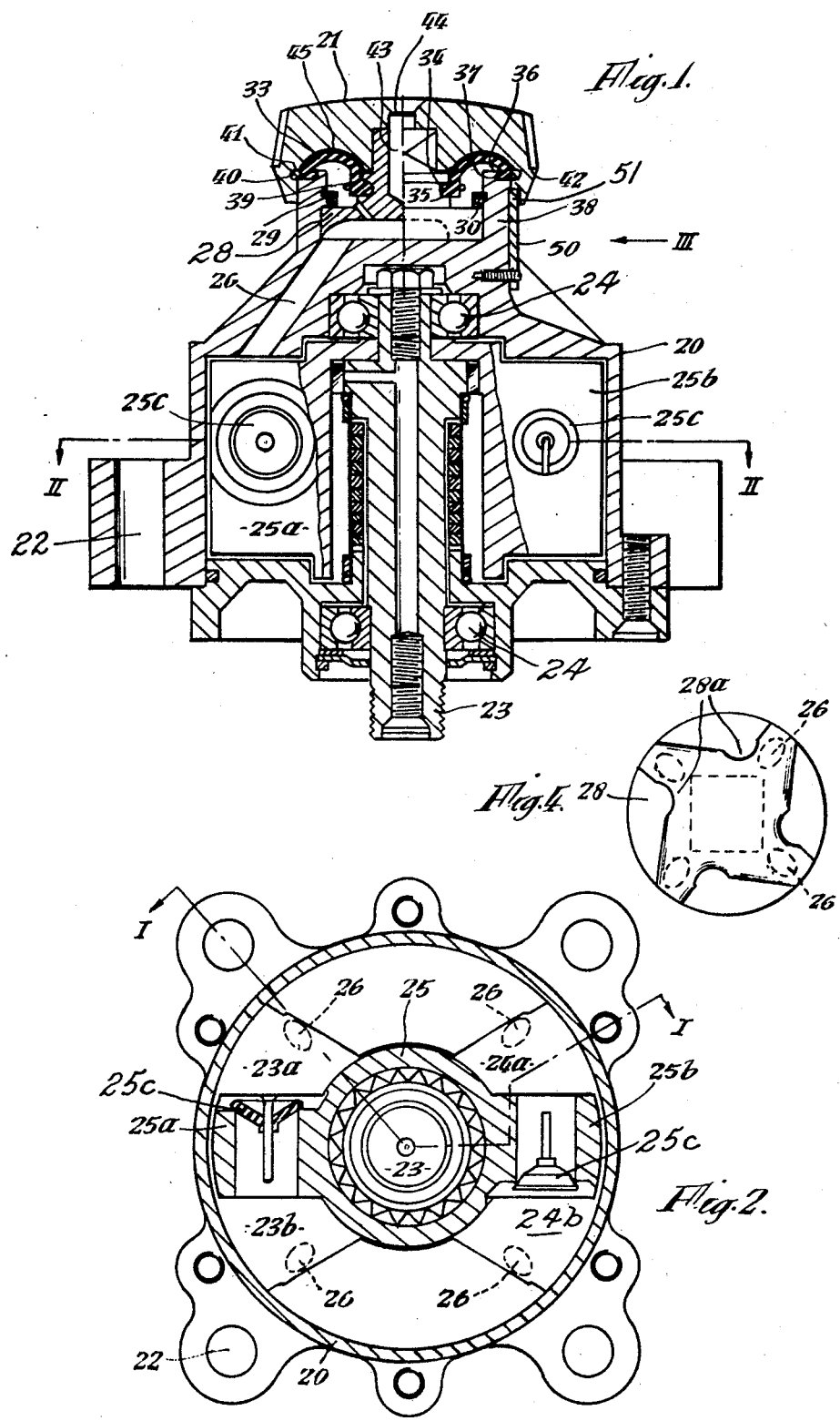

OSCILLATING PISTON-TYPE DASHPOTS

This invention relates to fluid dashpots having an arcuate range of movement through less than 360°.

One example of apparatus employing such a dashpot is disclosed in the specification of British Pat. No. 1,026,593. A vane member is angularly displaceable in a body having internal spaces into which the vanes of the member project, the spaces being filled with fluid that impedes movement of the vanes and thereby provides the dashpot resistance or damping effect. A variable valve control regulates the effective cross-sectional area of transfer passages for the flow of displaced fluid and so determines the damping rate.

Dashpots of the form described in that earlier patent are operated satisfactorily in service but it is found during manufacture of the dashpot that a percentage are rejected due to sealing defects and also, with prolonged use, leakage of the damping fluid may take place through deterioration of the seals which then consequently affects the damping response. A principal object of the present invention is to provide an arrangement whereby a potential source of such leakage through seals can be avoided and operational reliability thereby improved.

According to the invention, there is provided an adjustable dashpot comprising a valve member cooperating with passages in a surrounding body portion of the dashpot and fixed to a rotary control member to vary the fluid damping rate of the dashpot, a ring-form sealing member being arranged to prevent leakage of fluid from the region of the interface between the valve plate and its surrounding body portion, respective peripheral regions of the ring-form seal being sealingly secured to the valve member and to the dashpot body, a circumferential lip of the control member being arranged to be axially coincident with a first of said peripheral regions and a supplementary sealing member being gripped between said first region and the radially inner face formed by said lip to produce a seal therebetween.

Preferably, said circumferential lip has a portion, which may be necked, of the dashpot body extending coaxially within it, said first peripheral region of the ring-form member being secured to said body portion. With such an arrangement it is possible for there to be a calibrated scale and a fiduciary mark for the scale carried by respective ones of the overlapping parts in order to facilitate the rotational adjustment of the control member.

If the scale is secured to the body portion and a part of the scale projects into a tubular space formed by the clearance between the lip and the body, it can be arranged that the interior face of the lip has projecting elements at an angular spacing greater than the extent of said projecting part of the scale to cooperate with said projecting part in providing limits for the angular movement of the control member.

As a precaution against failure of the primary seal itself, e.g., due to porosity or pinholes, a resilient clamping band may be applied to said second of said peripheral regions of the ring-form sealing member to assist its engagement with the valve member. Additionally or alternatively an enclosed space may be formed between the ring-form member and the control member to the exterior of the seal, said space being filled with a lubricating grease.

Figure 3:
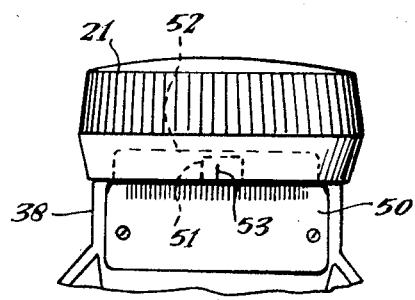

One embodiment of the invention will now be described with reference to the accompanying drawings, wherein:

FIG. 1 is a sectional elevation of a dashpot according to the invention on the line I—I in FIG. 2, FIG. 2 is a sectional view on the line II—II in FIG. 1, FIG. 3 is a part elevation of the dashpot in the direction of the arrow III in FIG. 1, FIG. 4 is a view of the valve member of the dashpot from below and, FIG. 5 is a sectional elevation of the upper part of a dashpot showing also a modification of the construction in FIG. 1.

Referring to the drawing, the dashpot comprises a body 20 within which are two arcuate spaces, a pivotable vane assembly 25 mounted on bearings 24 and having opposed vanes 25a, 25b dividing each space into two portions 23a, 23b and 24a, 24b respectively. Bolt holes 22 are provided to mount the dashpot through its body 20 and the vane assembly 25 is secured to a shaft 23, to the projecting end of which a movable member (not shown) to be controlled by the dashpot can be secured. Conduits 26 run between each portion of the internal body spaces and a plate valve 28. The valve 28 is held against that face in the body where it adjoins the conduits 26 by a circlip 29 and packing means such as a series of shims 30 or a crinkle washer (not shown) or by a screwed adapter ring 31 (FIG. 5) with a locking grub screw 32.

The valve 28 is fixed to a knurled adjusting knob 21 and comprises four equispaced lobed faces 28a which, depending upon the angular position of the valve, can progressively obscure the ends of the conduits 26 (the positions of which ends are indicated in dotted lines in FIG. 4) so as to restrict the flow of dashpot fluid between the conduits and the space between the faces 28a thus increasing the resistance of the dashpot. Nonreturn valves 25c are incorporated in the vanes of the assembly 25 between the portions 23a, 23b and 24a, 24b respectively to reduce the resistance to motion in the return direction. Thus, the dashpot is also to offer an adjustable resistance to rotation of the vane assembly 25 in one direction and a substantially unimpeded return movement of the assembly in the opposite direction.

The satisfactory operation of the dashpot over an extended period in service relies upon the prevention of leakage of the dashpot fluid since any ingress of air into the fluid passages can affect the damping characteristic markedly.

The main closure at the top of the dashpot adjacent the valve 28 is provided by a a flexible elastomer seal 33 which has an inner peripheral rib 34 bonded to a circumferential recess 35 of the stem of the valve 28, and an outer peripheral rib 36 bonded to an annular recess 37 in a top necked portion 38 of the dashpot body. A garter spring 39 encircles the inner rib 34 to seat in a recess in this region of the seal and the spring may be applied before the bonding together of the parts 34, 35 to exert a clamping pressure during this operation. At its outer lip, the seal 33 is held against its seating recess 37 by an O-ring 40 compressed between the seal and a groove 41 in overlying lip 42 of the control knob 21.

Thus, should there by any defects in the bonding between the parts 34 and 35 or 36 and 37, leakage past the lip 42 can still be prevented by the additional sealing effect of the garter spring 39 and the O-ring 40. Any possible leakage path along the shank of screw 43 securing the knob 21 to the stem of valve 28 is prevented by an elastomeric seal 44 immediately below the head of the screw. As a further precaution, the space 45 between the seal 33 and the knob 21 is packed with a silicone grease.

It will be appreciated that the inner face of the control knob lip 42 slides on the O-ring 40 when the knob position is adjusted and the frictional force generated by the ring assists in holding the knob fixed when it has been moved to a selected position and can provide a degree of resistance that will improve the ability to make small adjustments of the knob with accuracy.

The lip of the knob is also utilized in the indicating means for adjustment of the damping rate. For this purpose a graduated plate 50 is secured to the body necked portion 38 and a tongue 51 of the plate projects into a recess 52 that extends around part of the inner periphery of the lip 42. A fiduciary mark 53 on the knob can be aligned with a required scale division on the plate 50 when the damping rate is adjusted by rotation of the knob. The tongue 51 provides end stops for the movement of the knob, in conjunction with the end faces of the recess 52.

What I claim and desire to secure by Letters Patent is:

1. An adjustable dashpot comprising, in combination, a body, a damping member in said body, rotary bearings supporting said member for angular displacement in said body and at least one fluid-filled space into which said member projects to displace the fluid in said space with its angular movement, a valve member on said body and surrounded by a region of said body, conduit means between said space and said valve member for a flow of the displaced fluid through said valve member, means for adjustment of said valve member to vary the resistance offered by the fluid to movement of the damping member in said space, said adjustment means comprising a rotary control member connected to said valve member, a ring-form sealing member having respective peripheral portions bonded to the valve member and to said body to prevent leakage of fluid from the region of the interface between the valve member and its surrounding body region, the area of the sealing member between said peripheral portions being flexibly deformable with rotation of the control member, a circumferential lip of the control member being arranged to be axially coincident with a first of said peripheral regions of the sealing member, and a supplementary sealing member being gripped between said first peripheral region and a radially inner face of said lip to form a sliding seal between the sealing member and the lip of the control member.

2. A dashpot according to claim 1 wherein a resilient clamping band is applied to the second of said peripheral regions of the ring-form sealing member to assist its engagement with the valve member.

3. A dashpot according to claim 1 wherein an enclosed space is formed between the ring-form member and the control member to the exterior of the seal provided by said member, said space being filled with a grease.

4. A dashpot according to claim 1 wherein respective annular recessed regions are provided in the valve member and in the dashpot body to receive said peripheral regions of the ring-form sealing member.

5. A dashpot according to claim 1 wherein a portion of the dashpot body extends axially within said circumferential lip of the control knob, said first peripheral region of the ring-form member being secured to said body portion.

6. A dashpot according to claim 5 wherein said body portion extends axially from said at least one fluid-filled space within the body and is of lesser cross-sectional area in a plane transverse to the axial direction than the body in the region of said at least one space.

7. A dashpot according to claim 5 wherein a calibrated scale and a fiduciary mark are respectively carried by adjacent parts of said control member and body to indicate the rotational adjustment position of the control member on the body.

8. A dashpot according to claim 7 wherein a part of the scale projects into the space between the control member lip and said body portion, an interior face of the lip bounding said space, projecting elements on the interior face of the lip at an angular spacing greater than the angular extent of said projecting part of the scale being arranged to cooperate with said projecting part in defining limits for the angular movement of the control member.

* * * * *